(12) United States Patent
Akar

(10) Patent No.: US 12,502,812 B2
(45) Date of Patent: Dec. 23, 2025

(54) PET PREFORM INJECTION SYSTEM AND PRODUCTION METHOD

(71) Applicant: FR MAKINA VE MUHENDISLIK ANONIM SIRKETI, Bursa (TR)

(72) Inventor: Ramazan Akar, Bursa (TR)

(73) Assignee: FR MAKINA VE MUHENDISLIK ANONIM SIRKETI, Bursa (TR)

( * ) Notice: Subject to any disclaimer, the term of this patent is extended or adjusted under 35 U.S.C. 154(b) by 0 days.

(21) Appl. No.: 18/267,119

(22) PCT Filed: Dec. 25, 2021

(86) PCT No.: PCT/TR2021/051508
§ 371 (c)(1),
(2) Date: Jun. 14, 2023

(87) PCT Pub. No.: WO2023/121583
PCT Pub. Date: Jun. 29, 2023

(65) Prior Publication Data
US 2024/0375324 A1   Nov. 14, 2024

(51) Int. Cl.
*B29C 41/40* (2006.01)
*B29C 41/04* (2006.01)
*B29C 41/36* (2006.01)
*B29C 41/46* (2006.01)
*B29K 67/00* (2006.01)
*B29L 23/00* (2006.01)

(52) U.S. Cl.
CPC ............ *B29C 41/045* (2013.01); *B29C 41/36* (2013.01); *B29C 41/40* (2013.01); *B29C 41/46* (2013.01); *B29K 2067/003* (2013.01); *B29L 2023/00* (2013.01)

(58) Field of Classification Search
None
See application file for complete search history.

(56) References Cited

FOREIGN PATENT DOCUMENTS

| | | | |
|---|---|---|---|
| CN | 214 000 241 U | * | 8/2021 |
| CN | 214082548 U | | 8/2021 |
| KR | 101685080 B1 | | 12/2016 |
| TR | 2015/09868 A2 | * | 10/2016 |
| WO | WO-2016/065462 A1 | * | 5/2016 |

* cited by examiner

*Primary Examiner* — Mohammad M Ameen
(74) *Attorney, Agent, or Firm* — Jose Cherson Weissbrot

(57) ABSTRACT

The invention is related to the production of pet preform and similar plastic products, as well as similar-shaped metallic pieces manufactured by plastic injection.

6 Claims, 5 Drawing Sheets

PET PREFORM INJECTION SYSTEM AND PRODUCTION METHOD

TECHNICAL FIELD

Figure 1:
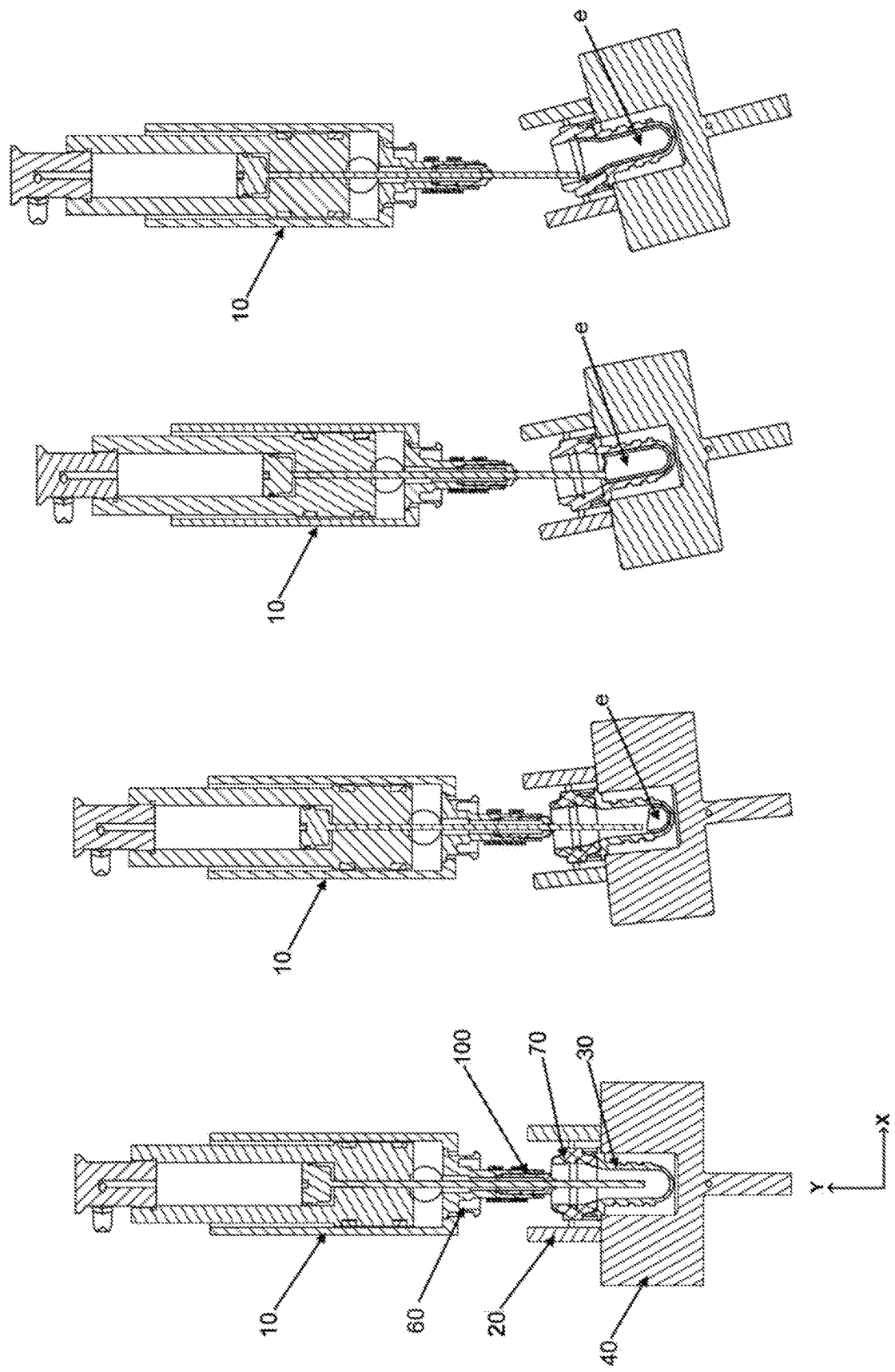

The invention is related to the production of pet preform and similar plastic products, as well as similar-shaped metallic pieces manufactured by plastic injection.

The invention is related to pet preform injection system and production method which provides for a more productive plastering of the molten material onto the cavity (female mold) walls by rendering the axial movements of the components rotational and linear during the casting of the molten material in pet preform production.

PRIOR ART

PET (POLYETHYLENE TERAPHTALATE), which is one of the basic materials of the plastic industry, is a raw material generally used in the production of bottles of drinks such as beverages. Bottle production is a type of production which involves a two-step process method of injection, followed by blowing, generally due to factors such as speed, volume, logistics and economy. The basis of the said two-step process method is based on creating a pre-form by means of production in a structure that resembles a test tube called PET preform in the injection process and then subjecting the obtained PET preforms to a thermal process again and shaping in a cold mold with the help of pressurized air and propulsive piston in the blowing machine.

In the prior art, pet preforms are produced in injection machines and based on injection molding method. In the production performed with injection machines, since very high pressure and temperature values are in question during the injection process, special steels are used, and accordingly, high-cost molding pieces are needed. In addition, since the pet material in the molten state is sprayed into the mold at a very high pressure and temperature, tension and expansion on metal parts is high. At the same time, hot runner needs to be used for the molten material to be transferred to the region where the molding pieces are located.

However, in the case there is a blockage in the said hot runner, the repairs take a long time and a loss of production occurs. In addition, since the needles called the "valve gate," which opens and closes the flow into the related pores of the mold within the hot runners, runs on compressed air, a compressor needs to be connected to the mold.

Whereas in the injection molding method, the mold used requires a high level of locking force. The locking process is performed with the hydraulic systems and high amounts of energy is spent for the same. The need for the hydraulic system affects the machine cost and tool life negatively.

With the purpose of eliminating the disadvantages faced in the injection molding method of the prior art, the inventors developed the rotational mold pet preform machine and production method number TR2015/09868. With the mentioned invention, a PET preform machine which melts the plastic granules, sprays the obtained molten plastic material into a rotatory mold, rotates the molten material in the mold with speed and shapes the product with the centrifugal force created has been presented. However, in the known state of the art, there is a need for a system and method which provides for the molten material to be plastered onto the cavity (female mold) walls in a more productive way.

In the above-mentioned pet preform machine and production method numbered TR2015/09868, the molten Pet material in the injection unit (10) in the first position of the injection unit (10) seen in FIG. 1 is casted into the cavity (30) which is rotating around the y axis by means of the present nozzle (100). In the meantime, the cavity (30) and the casting axis is centripetal. Then, the cavity (30) which rotates rapidly around the y axis ad adheres the molten material (e) to its surfaces also starts to rotate slowly around the Z axis angularly. In the meantime, the molten material (e) moves towards the claw (70) by being casted onto the walls of the cavity (30). During these movements, the injection unit (10) as well moves in the opposite direction of the x axis and in the direction of the y axis, providing the molten material (e) to be casted onto the inner surfaces of the mold. That is, a rotational movement on 2 axes at the same time and linear movement in 2 separate axes is in question.

Figure 2:
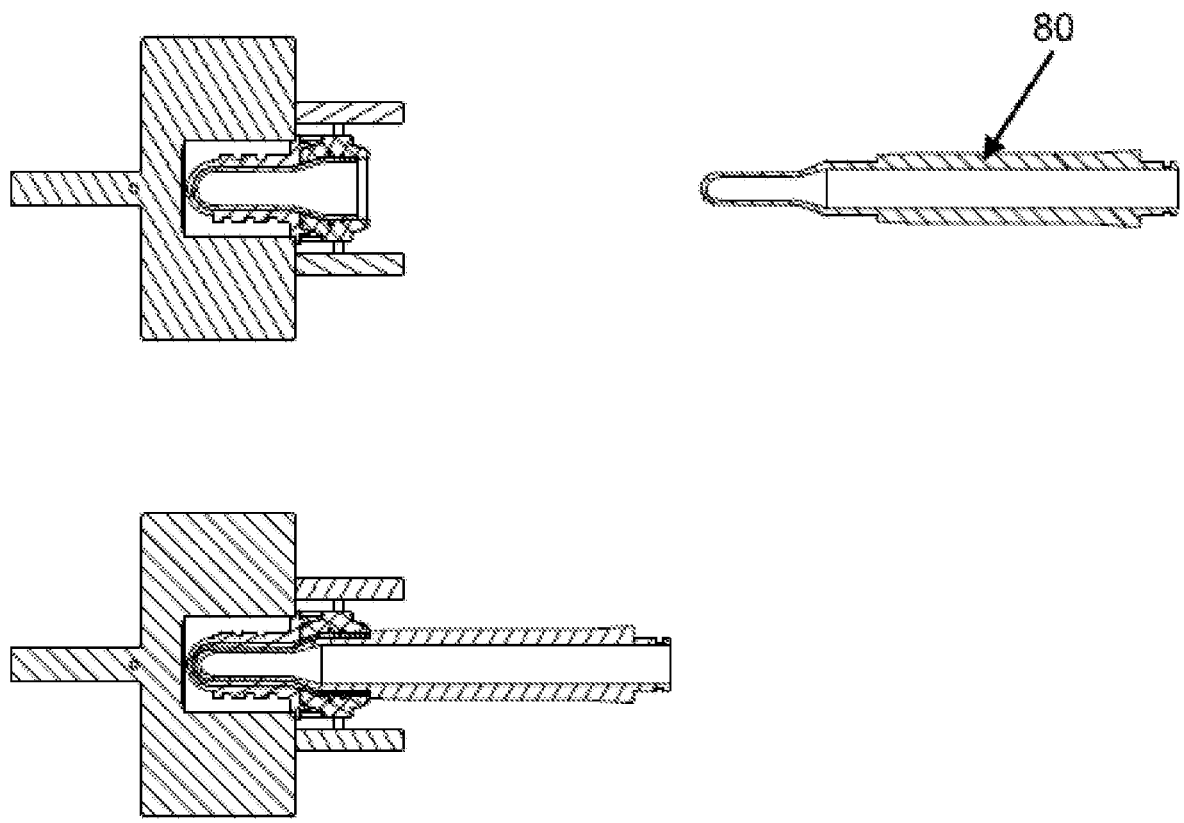

After the plastic that plasters the inner surface of the entire mold is finished, the cavity (30) continues its high-speed rotational movement and performs a rotational movement in order to be aligned with the core (80) as seen in FIG. 2 for the molding process and then, the core (80) enters into the cavity (80). Thereby, the molten material (e) adheres to the cavity (80) surfaces in a tighter fashion and both the final shape of the preform is formed and a more effective cooling can be performed since the increasing contact will enhance the heat transfer. The core (80) backs out after creating the shape of the preform and the preform stays within the mold. Then, the preform piece which is molded with the forward movement of the claw (70) on the cam (20) is ejected out. However, in the said production method, there is a need for a system which provides for the molten material (e) to be plastered onto the cavity (30) walls in a more productive way.

As a result, the presence of above problems and the forward insufficiency of the present solutions have made it necessary to make and improvement in the related technical field.

PURPOSE OF THE INVENTION

The present invention is related to a pet preform injection system and production method which eliminates the above-mentioned disadvantages and brings new advantages into the related technical field.

The main purpose of the invention is to put forth a pet preform injection system and production method which provides for a more productive plastering of the molten material onto the cavity (female mold) walls by rendering the axial movements of the components rotational and linear during the casting of the molten material in pet preform production.

The purpose of the invention is to provide the plastering of the molten plastic material to the cavity inner surface by being propelled from the injection unit thanks to a slot at the part of a newly designed nozzle that enters the cavity inner surface.

Another purpose of the invention is to provide for the entry of the nozzle in a manner that is close to the internal wall of the cavity, and for the molten material which comes from the slot on the nozzle to coat the cavity walls as it spins around the y axis of the cavity.

Another purpose of the invention is to provide the plastering of the molten material to the core surface this time with a shape similar to the core surface geometry, with the newly designed nozzle on which there is a slot.

Another purpose of the invention is to provide for the molten material which is pressed from the injection unit and which comes out of the slot on the nozzle as the core piece spins around the x axis once and slowly.

In order to achieve all the purposes mentioned above and that can be understood from the detailed description, the invention is related to a pet preform injection system which provides the production of pet preform in the plastic injection pet preform production industry, which comprises an injection unit that sends the molten material to the mold space, a cam that ejects the pet preforms produced from the mold, a cavity that forms the outer geometry of the pet preforms by the spraying of the molten material on its walls, a cavity housing which bears the cavity and has the internal channels circulating the cooling water in the cavity, the claw that forms the mouths of the pet preforms being produced, and a core that forms the inner geometry of the pet preforms. The invention is characterized in that:

it comprises a nozzle that bears to the injection unit by means of a nozzle socket, at the part that enters the inner surface of the cavity and in the shape of the inner surface of the pet preform, in order to provide the plastering of the molten material to the cavity walls from the inside.

The invention is also related to a pet preform production method which provides for producing pet preform in the plastic injection pet preform production industry. The invention is characterized in that it comprises the process steps of:

a) Entry of the nozzle in a manner that is close to the internal wall of the cavity, and as it spins around the y axis of the cavity, the molten material which comes from the slot on the nozzle coating the cavity walls, b) After the coating is finished, the cavity rotating again around the y axis rapidly and adhering the molten material to the cavity walls thoroughly under the effect of the centrifugal force and meanwhile, injection unit being ejected from the cavity, c) The cavity being brought to the same centripetal position with the core in order to give the final shape to the pet preform and the core forming the final shape of the preform by entering from the cavity whose surface is plastered with the molten pet and the center of the claw, d) The core being ejected from within the cavity and the obtained pet preform being ejected out by means of the cam and by the forward movement of the claw.

The structural and characteristic features of the invention and all the advantages will be understood more clearly thanks to the figures given below and the detailed description written by referencing these figures. Therefore, the evaluation should be made in consideration of these figures and the detailed description.

THE DRAWINGS ILLUSTRATING THE INVENTION

Figure 3:
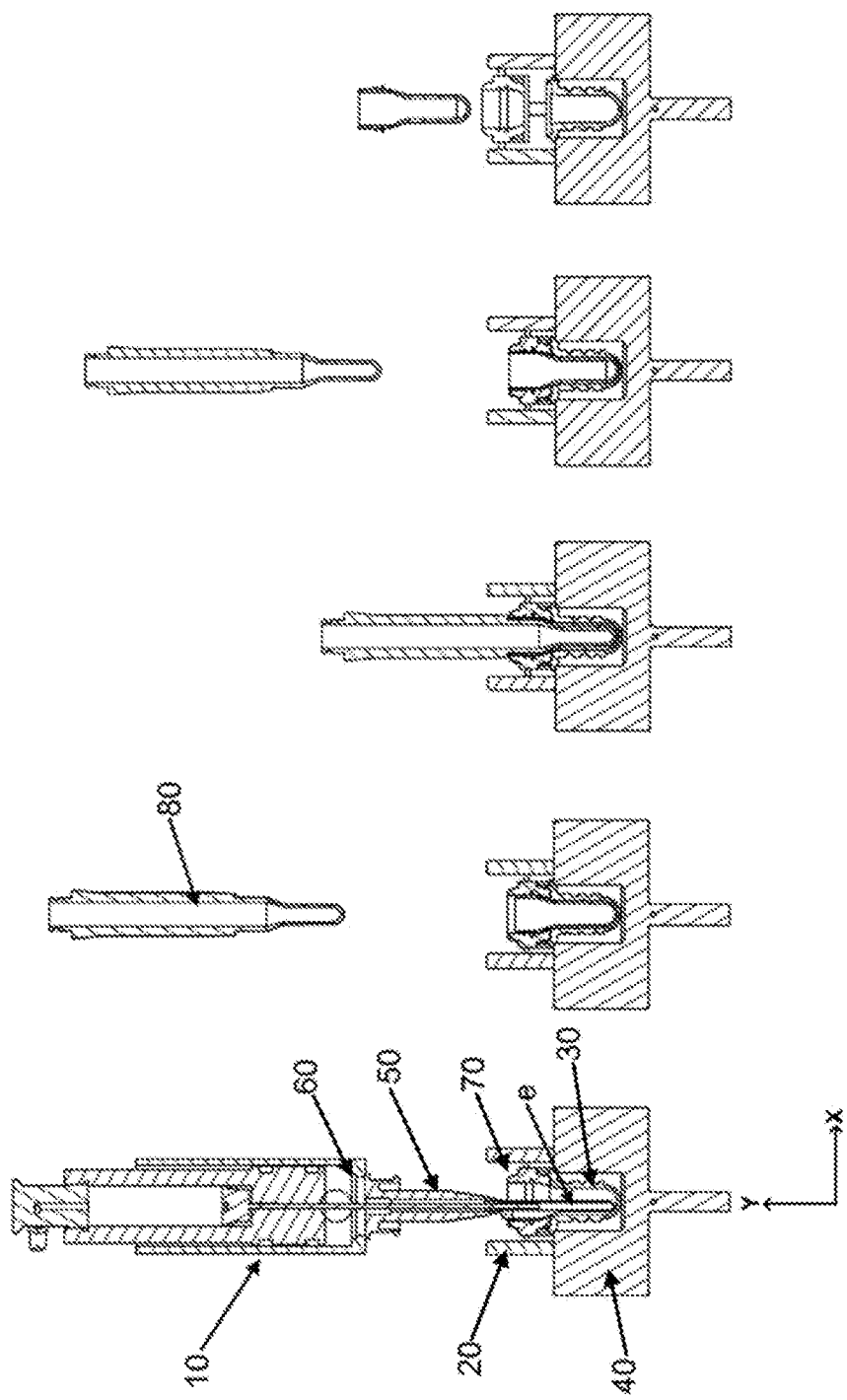
Figure 4:
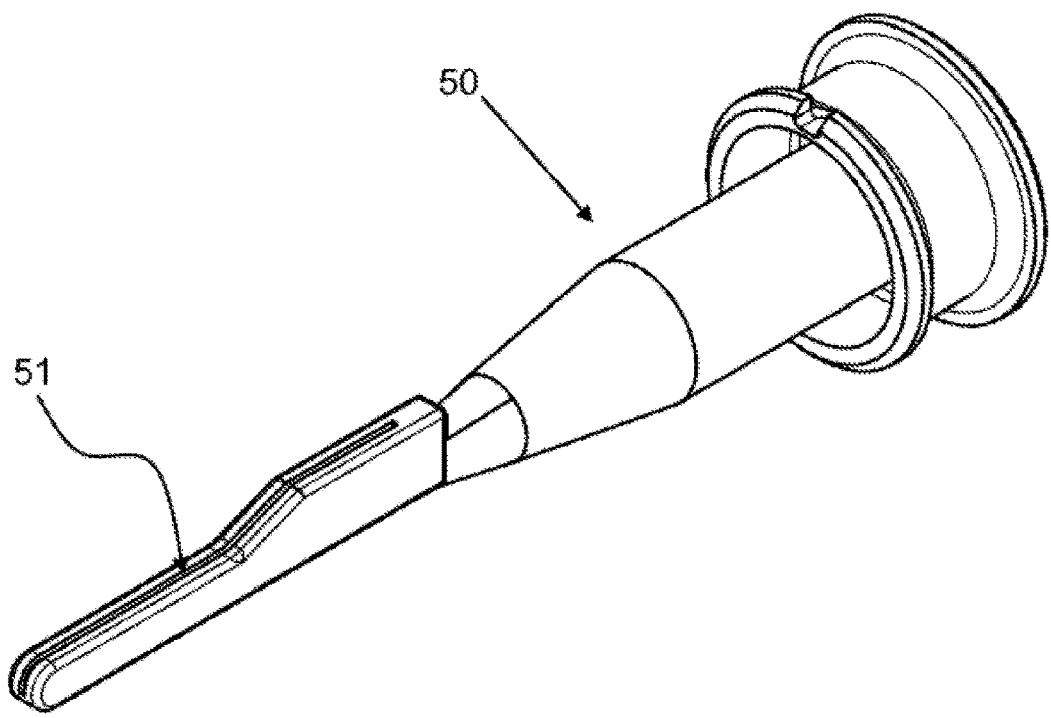
Figure 5:
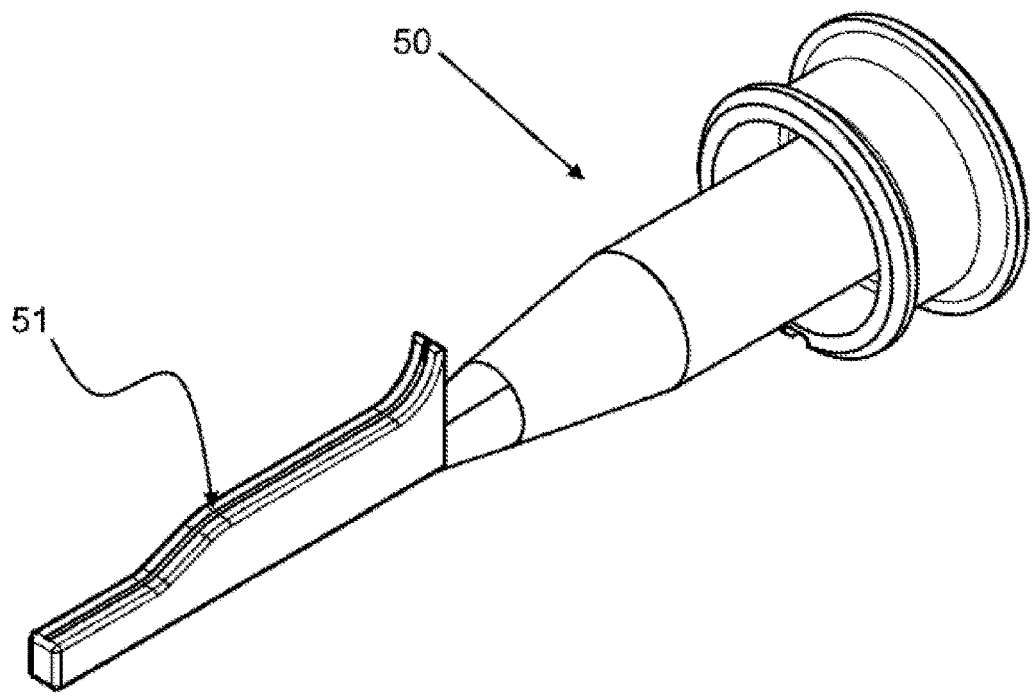
Figure 6:
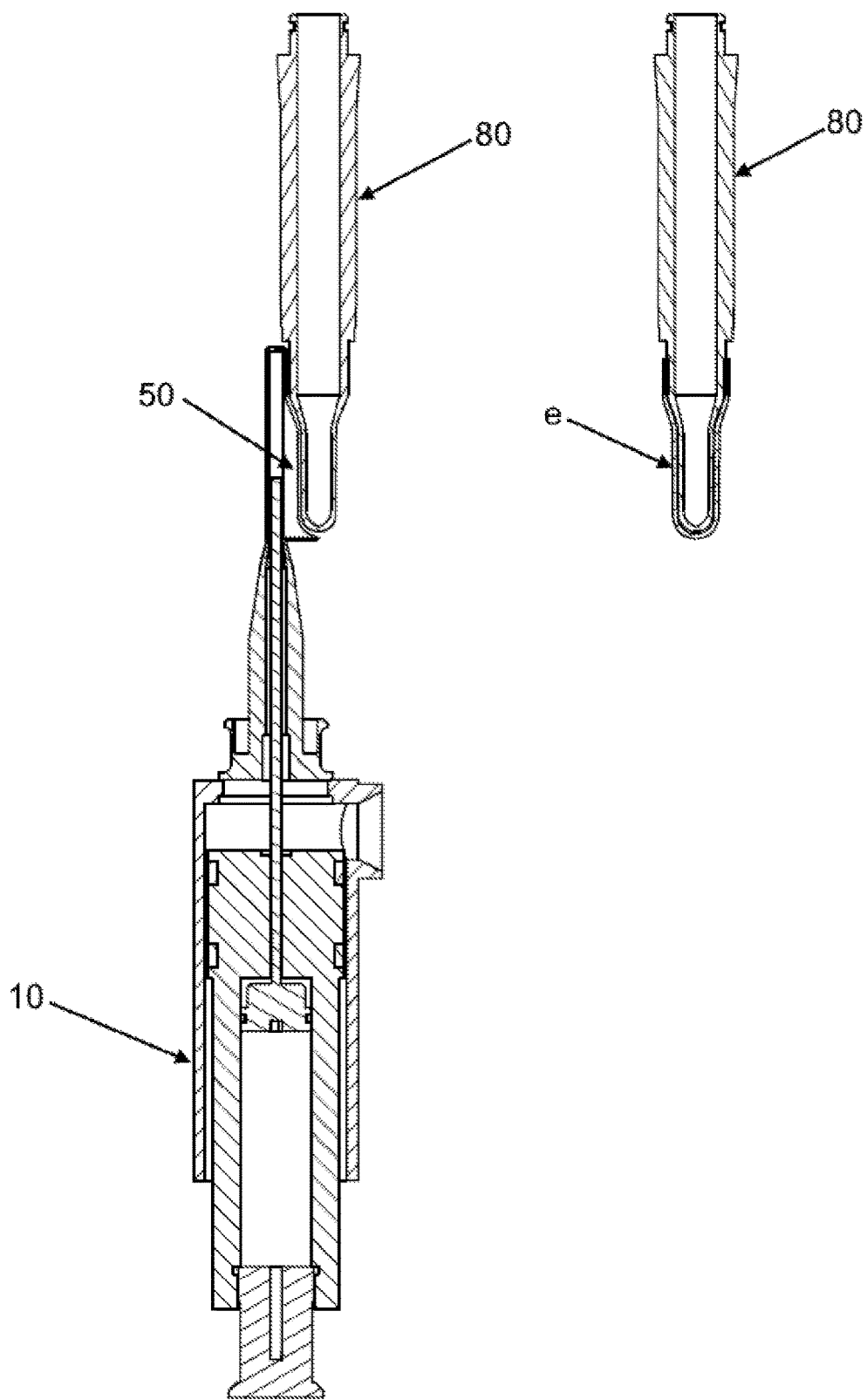

FIG. 1: View of the pet preform system of the prior art.
FIG. 2: Another view of the pet preform system of the prior art.
FIG. 3: View of the pet preform system of the invention.
FIG. 4: View of the nozzle of the pet preform system of the invention.
FIG. 5: View of the nozzle of the pet preform system in an alternative embodiment of the invention.
FIG. 6: View of the pet preform production method in an alternative embodiment of the invention.

DESCRIPTION OF THE PART REFERENCES

10. Injection unit
20. Cam
30. Cavity
40. Cavity housing
50. Nozzle
51. Slot
60. Nozzle socket
70. Claw
80. Core
100. Present nozzle
e. molten material

DETAILED DESCRIPTION OF THE INVENTION

In this detailed description, the preferred alternatives of the pet preform injection system of the invention is described in a way that creates no limiting effect and only for the better understanding of the subject.

In FIG. 3, sectional view of the pet preform injection system of the invention is given. Accordingly, in its most basic form, the pet preform injection system comprises an injection unit (10) that sends the molten material (e) to the mold space; a cam (20) that ejects the pet preforms produced from the mold, a cavity (30) that forms the outer geometry of the pet preforms by the spraying of the molten material (e) onto its walls, a cavity housing (40) which bears the cavity (30) and has the internal channels circulating the cooling water in the cavity (30), a nozzle (50) that provides the flow of the injection material (e) into the mold and bears the needle which stops the molten material (e) flow, nozzle socket (60) that bears the nozzle (50) to the injection unit (10), a claw (70) that forms the mouths of the pet preforms being produced, and a core (80) that forms the inner geometry of the pet preforms.

In the pet preform injection system of the invention, the nozzle (50) that provides the flow of the injection material (e) into the mold and bears the needle which stops the molten material (e) flow has a form suitable for the outer geometry of the pet preform, and a slot (51) is formed in the shape of the pet preform inner surface, at the part that enters the inner surface of the cavity (30), as seen in FIG. 4. The said nozzle (50) plasters the molten material (e) to the cavity (30) walls from within, by means of the mentioned slot (51). The nozzle (50) which has the slot (51) plasters the molten material (e) to the cavity (30) walls from within, in the method of coating the cavity (30) inner surface by plastering.

In an alternative embodiment of the invention, the said nozzle (50) with the slot (51) thereon can be in a suitable form to the core (80) surface geometry, as seen in FIG. 5. The said nozzle (50) plasters the molten material (e) to the core (80) outer wall in the method of coating the core (80) outer surface by plastering.

The procedure steps of the pet preform production method of the invention is as follows:

a) Entry of the nozzle (50) in a manner that is close to the internal wall of the cavity (30), and as it spins around the y axis of the cavity (30) once, the molten material (e) which comes from the slot (51) on the nozzle (50) coating the surfaces of the cavity (30).

b) After the coating is finished, the cavity (30) rotating again around the y axis rapidly and adhering the molten material (e) to the cavity (30) walls thoroughly under the effect of the centrifugal force and meanwhile, injection unit (10) being ejected from the cavity (30), c) The cavity (30) being brought to the same centripetal position with the core (80) in order to give the final shape to the pet preform and the core (80) forming the final shape of the preform by entering from the cavity (30) whose surface is plastered with the molten pet and the center of the claw (70) which is partially coated, d) The core (80) being ejected from the cavity (30) and the obtained pet preform being ejected out by means of the cam (20) and by the forward movement of the claw (07).

In an alternative embodiment of the invention, the core (80) outer surface can be coated by plastering in the pet preform production method. In this case, it can be provided that the molten material is plastered to the core (80) surface by using the nozzle (50) in a suitable form with the core (80) surface geometry (FIG. 5). As the core (80) spins around the x axis once and slowly, the molten material (e) which is pressed from the injection unit (10) and which comes out of the slot (51) on the nozzle (50) in the suitable form with the core (80) surface geometry is plastered to the outer surface of the core (80) as seen in FIG. 6. On the contrary of the cavity (30), it is important for the core (80) to rotate slowly. That is because the molten material (e) can be scattered out and removed from the core (80) surface when the rotation speed is too high, since the core surface is in the open, on the contrary of the rotary cavity (30).

In an alternative embodiment of the invention, after the plastering of the molten material (e) to the cavity (30) surfaces is performed, the preform shape can be formed by rotating the cavity (30) with a high speed only, that is, without the core (80) entering the cavity (30) which is plastered with the molten material (e). However, in this case, very high speeds (15.000 rpm and above) may need to be reached.

In another alternative embodiment of the invention, in the pet preform production method, as the core (80) makes the rotational movement around the x axis, at the same time, plastering the required areas of the entire core (80) surface with the molten material (e) can be provided by the linear movement of again the core (80) or the present nozzle (100) on the x axis. After the coating procedure, the molding procedures can be continued as in the plastering method made inside the cavity (30) and pet preform can be manufactured. At this point, with the molten material (e) plastered to the core (80) surface, problems such as the molten material (e) leaking or contacting the pieces during the entry to the cavity housing (40) wherein the cavity (30) and claw (70) of the core (80) are present may arise. As a solution to this problem, the core (80) and thereby the pet preform can be rendered conical.

In another alternative embodiment of the invention, in the production method of the pet preform, the core (80) can be submerged into a container comprising the molten material (e) and in this case, the plastering of the molten material (e) can be made on its surface by rotating the same around its own axis. However, in this case, it would be difficult to obtain a precise weight for the pet preforms, since the control of the molten material (e) could be difficult. In order to be able to overcome this problem, the core (80) can be submerged in the molten material (e) having a predetermined weight and it can be ensured that all of the molten material (e) is plastered onto the core (80). After the core (80) surface is plastered with the molten material (e), the procedure steps will be performed as in the above and the preform will be manufactured.

The invention claimed is:

1. A pet preform injection system comprising an injection unit (10) configured to sends a molten material (e) to a mold space; a cam (20) configured to eject the pet preforms produced from a mold; a cavity (30) configured to define an outer geometry of the pet preforms by spraying the molten material (e) onto its walls; a cavity housing (40) bears the cavity (30) and comprising internal channels circulating cooling water within the cavity (30); a claw (70) configured to forms mouths of the pet preforms; and a core (80) configured to forms an inner geometry of the pet preforms, wherein a nozzle (50) connected to the injection unit (10) by means of a nozzle socket (60), the nozzle (50) comprising a slot (51) at a part that enters the inner surface of the cavity (30) in the shape of the inner surface of the pet preform, in order to provide the plastering of the molten material (e) to the cavity (30) walls from the inside.

2. The pet preform injection system according to claim 1, wherein the nozzle (50) is shaped with an outer surface geometry of the core (80) in order to provide the plastering of the molten material (e) to the outer surface geometry of the core (80) from the outside.

3. A pet preform production method for producing pet preform in the plastic injection molding industry, the method comprising;

a) inserting a nozzle (50) in close proximity to an internal wall of a cavity (30), and rotating the nozzle (50) around y axis of the cavity (30), wherein molten material (e) is discharged from a slot (51) on the nozzle (50) and coats the cavity (30) walls, b) rotating the cavity (30) around the y axis rapidly and adhering the molten material (e) to the cavity (30) walls thoroughly under the effect of the centrifugal force and meanwhile, ejecting an injection unit (10) from the cavity (30), c) positioning the cavity (30) in alignment with a core (80) and a claw (70), wherein the core (80) forming the final shape of the pet preform by entering from the cavity (30) whose surface is plastered with molten pet and center of the claw (70), d) removing the core (80) from the cavity (30) and ejecting the obtained pet preform from a mold by means of a cam (20) and by forward movement of the claw (70).

4. The pet preform production method according to claim 3, wherein the molten material (e) discharged from the slot (51) being shaped with the core (80) outer surface geometry and is plastered onto the outer surface geometry of the core (80), as the core (80) spins slowly around the x axis.

5. The pet preform production method according to claim 3, wherein the method comprises a step of moving the core (80) or a nozzle (100) linearly along x axis, and plastering required areas of the core (80) surface with the molten material (e), during the rotational movement of the core (80) around the x axis.

6. The pet preform production method according to claim 3, wherein the method comprises a step of submerging the core (80) into a container comprising the molten material (e) and rotating the core (80) around its own axis to plaster the outer surface geometry of the core (80) with the molten material (e).

* * * * *